United States Patent
Cote et al.

(10) Patent No.: US 12,265,798 B2
(45) Date of Patent: Apr. 1, 2025

(54) CONTEXT-BASED RECOMMENDATIONS FOR ROBOTIC PROCESS AUTOMATION DESIGN

(71) Applicant: SERVICENOW CANADA INC., Montreal (CA)

(72) Inventors: Marie-Claude Cote, Montreal (CA); Alexei Nordell-Markovits, Montreal (CA); Andrej Todosic, Montreal (CA)

(73) Assignee: ServiceNow Canada Inc., Montreal (CA)

( * ) Notice: Subject to any disclaimer, the term of this patent is extended or adjusted under 35 U.S.C. 154(b) by 441 days.

(21) Appl. No.: 17/250,912

(22) PCT Filed: Sep. 26, 2019

(86) PCT No.: PCT/CA2019/051373
§ 371 (c)(1),
(2) Date: Mar. 26, 2021

(87) PCT Pub. No.: WO2020/061697
PCT Pub. Date: Apr. 2, 2020

(65) Prior Publication Data
US 2021/0342124 A1    Nov. 4, 2021

Related U.S. Application Data

(60) Provisional application No. 62/738,044, filed on Sep. 28, 2018.

(51) Int. Cl.
*G06F 8/20* (2018.01)
*G06N 5/04* (2023.01)
*G06N 20/00* (2019.01)

(52) U.S. Cl.
CPC .................. *G06F 8/20* (2013.01); *G06N 5/04* (2013.01); *G06N 20/00* (2019.01)

(58) Field of Classification Search
CPC ........... B60Y 2400/112; B60Y 2200/91; B60L 58/12; B60L 53/126
See application file for complete search history.

(56) References Cited

U.S. PATENT DOCUMENTS 8,396,815 B2    3/2013    Drory et al.
9,555,544 B2    1/2017    Bataller et al.
(Continued)

FOREIGN PATENT DOCUMENTS

CN    108388425 A    8/2018
EP    1565813 A4    6/2009
(Continued)

OTHER PUBLICATIONS

Jan et al., "How do Machine Learning, Robotic Process Automation, and Blockchains Affect the Human Factor in Business Process Management?" (Year: 2018).*

(Continued)

*Primary Examiner* — Phillip H Nguyen
(74) *Attorney, Agent, or Firm* — Fasken Martineau DuMoulin LLP; Johann Gest

(57) ABSTRACT

Systems and methods for adding process actions to the design of a robotic software process. A context-recognition module recognizes a current state of a process being designed, and passes information on that current state to a recommendation module. The recommendation module evaluates the current state and identifies at least one suitable process action to recommend in response to that current state. The recommendation module then recommends the at least one process action to the human designer. If the designer accepts the recommendation, a design module adds the process action to the process design. The recommendation module may also use information about previous actions in the process and in other processes when identifying suitable process actions. The context-recognition mod- (Continued)

ule and the recommendation module may each comprise at least one machine learning module, which may or may not be neural network based.

17 Claims, 2 Drawing Sheets

(56) References Cited

U.S. PATENT DOCUMENTS

| | | | |
|---|---|---|---|
| 9,703,607 | B2 | 7/2017 | Muthuvaradharajan |
| 9,817,967 | B1 | 11/2017 | Shukla et al. |
| 10,766,136 | B1* | 9/2020 | Porter .................... G06N 3/045 |
| 2014/0026113 | A1 | 1/2014 | Farooqi |
| 2014/0173555 | A1 | 6/2014 | Ng et al. |
| 2016/0299977 | A1* | 10/2016 | Hreha ................. G06F 16/9537 |
| 2017/0228119 | A1 | 8/2017 | Hosbettu et al. |
| 2017/0357893 | A1* | 12/2017 | Dexter .................... A63F 13/35 |
| 2018/0052664 | A1 | 2/2018 | Zhang |
| 2018/0165590 | A1 | 6/2018 | Vlassis et al. |
| 2018/0197123 | A1 | 7/2018 | Parimelazhagan et al. |
| 2019/0066018 | A1 | 2/2019 | Sethi et al. |
| 2019/0272917 | A1* | 9/2019 | Couture ................. G16H 40/67 |

FOREIGN PATENT DOCUMENTS

| | | |
|---|---|---|
| EP | 3206170 A | 8/2017 |
| JP | 201888242 A | 6/2018 |
| WO | 20170208135 A | 12/2017 |

OTHER PUBLICATIONS

Kulisiewicz et al., "Robotic Process Automation—Current State, Expectations and Challenges" (Year: 2018).*

Abrahamsson et al., "Agile Software Development Methods: Review and Analysis", VTT publicatin, Espoo, Finland, 2002.

Hossain, "Evaluation of agile methods and implementation", Centria University of Applied Sciences, Degree Programme in Information Technology, Jun. 2015.

Communication pursuant to Article 94(3) EPC dated Jan. 1, 2025, European Patent Office, Application n. No. 19866401.3 filed Sep. 26, 2019.

Office Action dated Jan. 25, 2025, China National Intellectual Property Administration, Application 201980078331.8 filed Sep. 26, 2019.

* cited by examiner

CONTEXT-BASED RECOMMENDATIONS FOR ROBOTIC PROCESS AUTOMATION DESIGN

CROSS REFERENCE TO RELATED APPLICATIONS

The present application is a U.S National Phase Application pursuant to 35 U.S.C § 371 of International Application No. PCT/CA2019/051373 filed Sep. 26, 2019, which claims priority to U.S. Provisional Patent Application No. 62/738,044 filed Sep. 28, 2018. The entire disclosure contents of these applications are herewith incorporated by reference into the present application.

TECHNICAL FIELD

The present invention relates to robotic process automation. More specifically, the present invention relates to simplifying the design of robotic process automations.

BACKGROUND

The use of robotic process automation, or "RPA", to automate routine business tasks, is rapidly becoming more widespread. Software 'robots' (software modules configured for one process) can manipulate data, generate e-mail responses, and perform many other tasks. Many of these tasks—for instance, copying and pasting large amounts of data from one system into another system—are tedious for humans and often error-prone. Using RPA robots (also known as 'bots' or 'robotic agents') allows human operators and overseers to focus their efforts on more critical tasks.

However, the software robots are still designed by humans. Designing these can be a difficult and time-consuming task, as the designer is required to precisely specify a sequence of process steps that are to be included in an automation. Among other things, when designing an automated robotic agent, the human designer aims to determine the most efficient sequence of steps. However, this most efficient sequence may not always be the traditional method. Moreover, current design methods are extremely granular. For instance, rather than designing an RPA workflow path to say 'copy data K to system Y', the human often has to design the following: 'open system X; search for K in system X; when found, copy K into device storage; open system Y; determine field for data K in system Y; copy K from device storage into that field in system Y'. As can be seen, even automating simple repetitive processes can be delicate and tedious work with a high probability of mistakes.

Thus, there is clearly a need for systems and methods that simplify the tasks relating to the designing of RPA bots or robotic agents. Preferably, these systems and methods could provide context-based design recommendations to designers.

SUMMARY

The present invention provides systems and methods for adding process actions to the design of a robotic software process. A context-recognition module recognizes a current state of a process being designed and passes information on that current state to a recommendation module. The recommendation module evaluates the current state and identifies at least one suitable process action to recommend in response to that current state. The recommendation module then recommends the at least one process action to the human designer. If the designer accepts the recommendation, a design module adds the process action to the process design. The recommendation module may also use information about previous actions in the process and in other processes when identifying suitable process actions. The context-recognition module and the recommendation module may each comprise at least one machine learning module, which may or may not be neural network based.

In a first aspect, the present invention provides a method for adding at least one process action to a design of a software process, the method comprising:
(a) recognizing a current state in said software process;
(b) based on said current state, making a recommendation of said at least one process action to a designer of said software process;
(c) receiving a response to said recommendation from said designer; and
(d) adding said at least one process action to said design when said response is an acceptance of said at least one process action,
wherein machine learning techniques are used in making said recommendation in step (b).

In a second aspect, the present invention provides a system for adding at least one process action to a design of a software process, the system comprising:
a context-recognition module for recognizing a current state of said software process;
a recommendation module for:
  making an evaluation of said current state;
  based on said evaluation, determining said at least one process action to recommend;
  making a recommendation of said at least one process action to a designer of said software process; and
  receiving a response to said recommendation from said designer; and
a design module for adding said at least one process action to said design when said response is an acceptance of said process action.

In a third aspect, the present invention provides non-transitory computer-readable media having encoded thereon computer-readable and computer-executable instructions that, when executed, implement a method for adding at least one process action to a design of a software process, the method comprising:
(a) recognizing a current state in said software process;
(b) based on said current state, making a recommendation of said at least one process action to a designer of said software process;
(c) receiving a response to said recommendation from said designer; and
(d) adding said at least one process action to said design when said response is an acceptance of said at least one process action
wherein machine learning techniques are used in making said recommendation in step (b).

BRIEF DESCRIPTION OF THE DRAWINGS

The present invention will now be described by reference to the following figures, in which identical reference numerals refer to identical elements and in which.

DETAILED DESCRIPTION

The present invention recommends process actions to be added to the design of a robotic process automation. The recommendations are contextual and depend on the current state of the process being designed. That is, recommended actions at the beginning of a process will not necessarily be the same as recommended actions close to the end of that process. (Some actions may, of course, be continually recommended—for instance, a 'Save' action might be consistently suggested.) However, in general, the recommended actions will vary with each process and each completed process step.

As an example, a designer may want to build a process automation robot that will open an email, open a document in attachment in the email, copy some fields of the document in a spreadsheet, close the document and save the second document. During the design of this process automation robot, the present invention could recognize (after the step 'open the email') that there is an attachment to the email, and automatically suggest that the next step in the process should be 'open and save attached document'. Next, the present invention could suggest a list of relevant fields that the user might select data from. In a preferred implementation (as will be discussed in more detail below), the present invention uses machine learning techniques in making these recommendations. Specifically, in this case, the system would suggest these fields because machine learning modules in the system have 'learnt', using historical process data, that the receipt of an email with an attachment is often followed by the extraction of content to be copied elsewhere.

Figure 1:
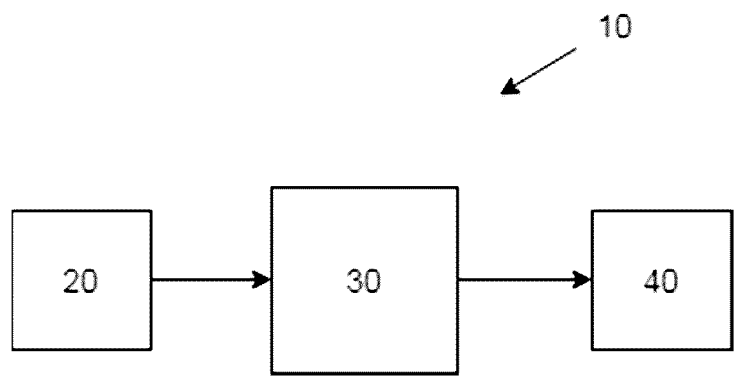
FIG. 1 is a block diagram of a system according to one aspect of the invention.

Referring now to FIG. 1, a block diagram illustrates a system according to one aspect of the invention. In the system 10, a context-recognition module 20 recognizes the current state of the process being designed and transmits details of that current state to a recommendation module 30. The recommendation module 30 then evaluates the current state of the process. Based on that evaluation, the recommendation module 30 then determines what (if any) process actions should be presented, and recommends those process action(s) to the designer. The designer responds to the recommendation, either by accepting the recommendation or by rejecting the recommendation. If the designer accepts the recommendation, a design module 40 adds the recommended process action(s) to the process design. On the other hand, if the designer rejects the recommended process action(s), the recommendation module 30 may recommend a different process action, or may wait for new state information. As will be described in more detail below, the system may collect and store information related to the current state and to any recommended process actions, as well as to whether those actions were accepted or rejected by the designer. This data may be used to continually refine the recommendations produced by the recommendation module 30.

As an example, one process may involve opening an email application. The 'current state' of the process would then be 'that email application is now open'. The context-recognition module 20 would identify that state and pass information related to the state to the recommendation module 30. The recommendation module 30 would evaluate the state and determine possible process actions to recommend. One such process action could be 'open a new email window'. Another could be 'open a specific email template'. Another could be 'flag all emails from a specific sender as "High Priority"'. As will be discussed below, these actions may be determined solely based on the current state information or on additional information. The recommendation module 30 will then present the recommended process actions to the designer. If the designer accepts a recommendation, the associated process action will be added to the design of the process.

Note that the 'design of the process' may be represented in many ways (for instance, as a flowchart that the designer builds in an RPA design environment). Typically, however, no matter what superficial representation is used, each process will correspond to a software file that expands as the designer adds more steps. Each process action will likewise correspond to a section of software code. If the designer accepts a recommendation, the associated section of software code will be added to the process's software file at the appropriate location.

As should be clear, multiple process actions may be recommended for any given state of the process. That is, multiple different process actions may reasonably follow a particular point in the process. Recommendations may be presented either simultaneously or sequentially. That is, in some implementations, the designer may be permitted to choose from a simultaneous list of multiple recommended process actions, each of which might follow the same particular state of the process. In other implementations, multiple recommendations related to a single particular state may be presented one after the other. These recommendations would be presented either until the designer selects one action or until the designer rejects all of the actions presented. It may be preferable to present the designer a 'reject all' option early on, to minimize frustration. This would be particularly preferable if the recommendations were configured to interfere with the normal operation of the designer's device. In such cases, also, it would be preferable to rank the process actions in order of their suitability for the current process. Once ranked, the recommendations could be presented to the designer so that the 'most-recommended' action was presented first, then the 'second-most recommended' action was presented, and so on.

There may also be scenarios in which the recommendation module 30 cannot determine which process actions to recommend, or cannot determine that any process actions should be recommended. In such scenarios, the recommendation module 30 could be configured to wait until a new current state is received. Alternatively, the recommendation module 30 could present a list of default actions. Such default actions could include predictable actions in the given context, such as 'Save' or 'Open New Window'.

Process actions may be standalone, simple actions, such as "delete current value from storage". Alternatively, however, process actions may be complex. A single process action may include many smaller process actions. For instance, rather than the multi-step copying sequence outlined above ("open system X", etc.), the present invention could recommend that the user select "copy K to system Y". This single 'higher-level' process action is more intelligible to human users than the many step process that is typically required, and is also less vulnerable to human error.

Additionally, a single recommendation might comprise multiple 'higher-level' process actions. For instance, at some point in a process, the recommendation module 30 might recommend that a certain file be 'Saved'. Once that recommendation was accepted, the next recommendation might be 'Close File'. The next recommendation could then be 'Open New File'. In other scenarios, all these process actions may be recommended at once—i.e., the designer would be presented with the recommendation to 'Save File—Close File—Open New File'.

As would be clear to the person skilled in the art, the RPA designer may use any kind of design environment, including but not limited to a GUI-based environment or a text-based environment. In some implementations, moreover, the designer may "record" themselves or others performing the process that is to be automated. In such implementations, the design of the RPA process would not occur in any particular environment. Thus, the current invention can be configured to present its recommendations in any form suitable for a given environment. For instance, in a GUI-based design environment, recommended process actions may appear in drop-down menus or as drag-and-drop icons. On the other hand, in a text-based design environment, recommended process actions may appear as 'shadow text' that 'completes' a half-typed word. (Of course, a text-based environment may also use drop-downs, and vice versa, again depending on the implementation.) As another example, recommended process actions may appear as 'pop-ups' or notifications on the designer's display device.

The process actions recommended by the recommendation module 30 may be any kind of suitable action. They may include, but are not limited to: data manipulation actions, such as copy, paste, and delete; actions related to interactions between systems, such as moving data from one application to another; communication-related actions, such as sending emails or, for a 'chatbot'-type process, delivering individualized responses; and storage-related actions, such as saving files.

In some implementations, the context-recognition module 20 and the recommendation module 30 comprise rules-based modules. However, due to the volume of data these modules are likely to receive, and the many different scenarios in which they may receive that data, it may be difficult to develop rules covering each situation. Thus, it is preferable that these modules each comprise a trained machine learning submodule that may or may not be neural-network based. In the case of the context-recognition module 20, a machine learning submodule could be trained to identify many possible process states based on system information.

In the case of the recommendation module 30, a machine learning submodule could be trained to evaluate the current process state and identify suitable process actions in response. Depending on the implementation, further, and on the process being designed, the recommendation module 30 may comprise multiple neural networks. For instance, one neural network could be responsible for encoding contextual information into a single numerical representation, while another machine learning submodule could use that representation to recommend actions based on the encoded context. An example of relevant neural network applications would be using well-known natural language processing techniques to identify language-based (communication-related) actions. The recommendation module 30 could comprise a neural network for evaluating the suitability of a given action relative to any given process state. (Suitability may also be termed 'recommendation strength' or the probability that the designer will accept the recommended action.) Once trained, a machine-learning based recommendation module 30 will receive as input an encoding of the current state: that is, contextual information related to the process state that has been encoded in a standard representation format and that may be language-based information or visual information. The machine-learning based recommendation module 30 may then determine a list of potential process actions and the probability that each action will be accepted by the designer. As would be clear to the person skilled in the art, however, the context-recognition module 20 and the recommendation module 30 may comprise any combination of rule-based and neural-network-based elements.

Figure 2:
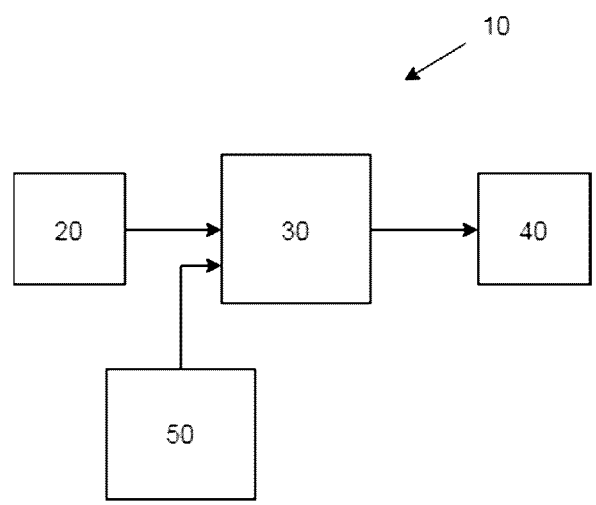
FIG. 2 is a block diagram of another embodiment of the system of FIG. 1.

FIG. 2 is a block diagram showing another embodiment of the system in FIG. 1. The system shown in FIG. 2 is very similar to that in FIG. 1: a context-recognition module 20 sends information about a current state of a process to a recommendation module 30. The recommendation module 30 identifies suitable process actions and recommends those process actions to the designer. If the designer accepts the recommendation(s), a design module 40 adds that process action to the overall design of the software process. However, in this embodiment, the recommendation module 30 also receives information from a history module 50.

The history module 50 stores information related to the process currently being designed. Additionally, the history module 50 may store information related to processes previously designed by the current designer and/or to processes designed by others. The recommendation module 30 can use such information when determining suitable responses to a given process state. The history module 50 may also store contextual information related to each state of a process, as well as information related to the process actions that were recommended in response to that state, and information related to the recommended process actions that were accepted by the designer. Similarly, the history module 50 may store data related to which recommended process actions were not accepted by the designer. This information can then be used in the next stage of training for the machine-learning based recommendation module 30. Alternatively, if primarily rules-based modules are used, this information may be used in establishing new rules later on. Thus, this information can be used to refine future recommendations, and increase the likelihood that those future recommendations will be accepted by the designer. As an example, using information from the history module 50, the recommendation module 30 might determine that the most common action taken in 'current state X' is 'action A'. The recommendation module 30 could then determine that action A should be recommended to the designer. As another example, the recommendation module 30 could primarily rely on information from the history module 50. For instance, the 'current state X' may be unremarkable or undistinguished—for instance, the current state might reflect a changeover point in the process, where no software applications are active. At such a point, the recommendation module 30 would be able to identify numerous possible process actions, but would have little way to distinguish between them. In such a case, previous actions in the process might provide guidance. That is, the recommendation module 30 could use information from the history module 50 about previous actions in the current process to recommend next steps. Likewise, information related to other similar processes could be used by the recommendation module 30 to determine what process actions should be recommended.

Figure 3:
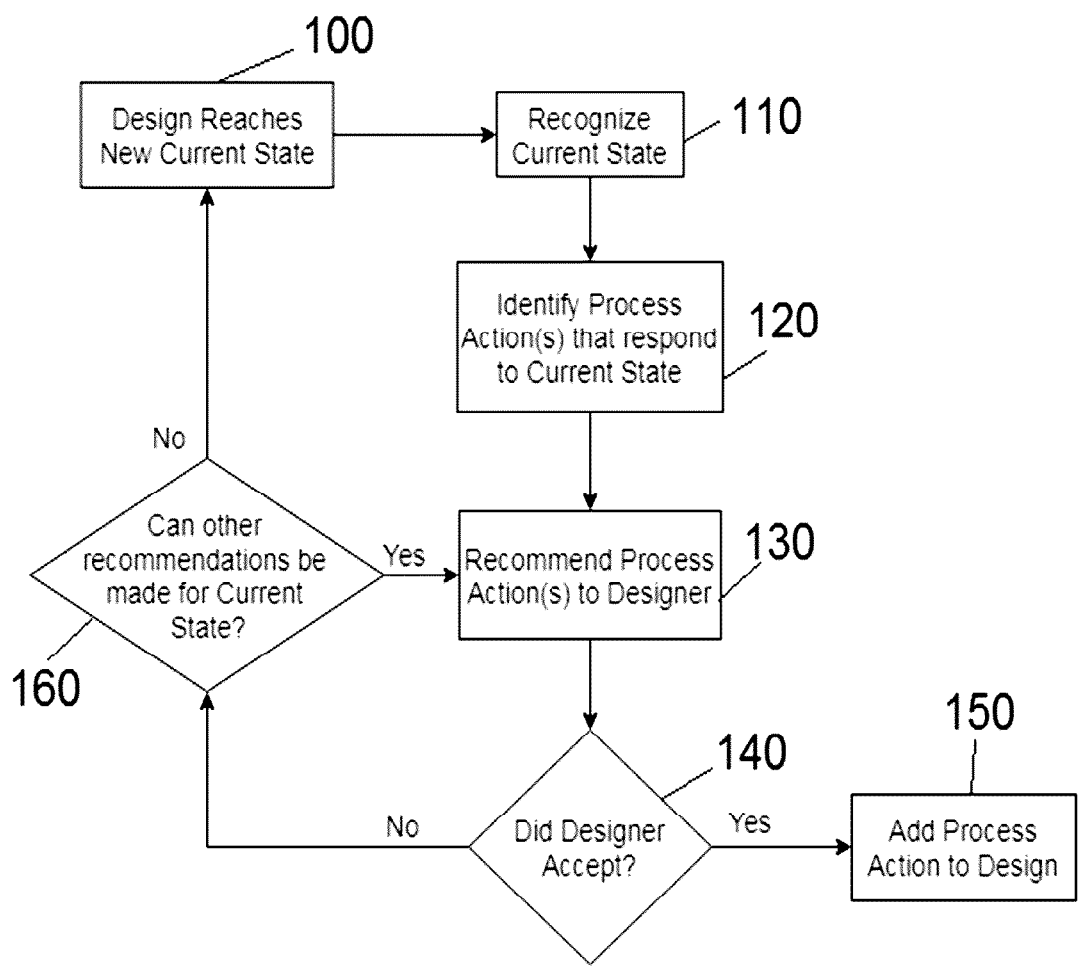
FIG. 3 is a flowchart detailing a method according to one aspect of the invention.

FIG. 3 is a flowchart detailing a method according to one aspect of the present invention. At step 100, the process design reaches some new current state. This might include receiving a message, opening an application, or any other event or change. At step 110, the new current state is recognized. Then, at step 120, at least one suitable process action that responds to the current state is identified. This at least one process action is then recommended to the designer at step 130.

At decision 140, the method determines whether the designer has accepted or rejected the recommendation. If the designer accepted the recommendation, the at least one process action is added to the process design at step 150. At this point, the method may end or repeat with a new current state (i.e., the method may end or return to step 100).

If, on the other hand, the designer rejected the recommendation, decision 160 asks if any other process actions can be recommended for the current state of the process. If so, the method returns to step 130 and those other process actions are recommended to the designer. However, if no other process actions can be recommended, the method waits for the design to reach a new current state (i.e., returning to step 100). As would be clear, for the design to reach that new current state from decision 160, the designer would have continue the design unaided, as no more recommendations would be made for that state.

It should be clear that the various aspects of the present invention may be implemented as software modules in an overall software system. As such, the present invention may thus take the form of computer executable instructions that, when executed, implements various software modules with predefined functions.

Additionally, it should be clear that, unless otherwise specified, any references herein to 'image' or to 'images' refer to a digital image or to digital images, comprising pixels or picture cells. Likewise, any references to an 'audio file' or to 'audio files' refer to digital audio files, unless otherwise specified. 'Video', 'video files', 'data objects', 'data files' and all other such terms should be taken to mean digital files and/or data objects, unless otherwise specified.

The embodiments of the invention may be executed by a data processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g., "C" or "Go") or an object-oriented language (e.g., "C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

What is claimed is:

1. A method for adding at least one process action to a design of a software process, the software process comprising a plurality of process steps, the software process corresponding to a software file, the method being executed by a processor, the processor being operatively connected to a user interface, the method comprising:
   recognizing a current state in said software process, said current state being associated with contextual information;
   encoding, by a first trained neural network, contextual information of said current state to obtain an encoded context, said encoded context being a single numerical representation;
   evaluating, based on said encoded context, by a second trained neural network, suitability of at least one process action relative to the current state;
   making a recommendation of said at least one process action based on said evaluated suitability;
   transmitting, to the user interface, said recommendation to a designer of said software process;
   receiving, from the user interface, a response to said recommendation from said designer; and
   adding said at least one process action to said design of said software process when said response is an acceptance of said at least one process action, said adding comprising adding a section of software code corresponding to said at least one process action in the software file.

2. The method according to claim 1, further comprising a plurality of process actions, wherein all of said plurality of process actions are recommended to said user simultaneously.

3. The method according to claim 1, further comprising a plurality of process actions, wherein each of said plurality of process actions is recommended to said user sequentially.

4. The method according to claim 1, wherein said at least one process action comprises multiple sub-actions.

5. The method according to claim 1, wherein said current state is related to a current action in said software process.

6. The method according to claim 1, wherein said recommending in step (b) is further based on at least one previous action in said software process.

7. The method according to claim 1, wherein said at least one process action is at least one of:
   a data manipulation action;
   an action related to an interaction between systems;

a communication-related action; and a storage-related action.

8. The method of claim 1, further comprising the steps of:
collecting data related to: said current state; said at least one process action; and said response; and using machine learning with said data to refine future recommendations.

9. A system for adding at least one process action to a design of a software process, the software process comprising a plurality of process steps, the software process corresponding to a software file, the system comprising:

a processor;

a non-transitory storage medium operatively connected to the processor, the non-transitory storage medium comprising computer-readable instructions;

the processor being operatively connected to a user interface, the processor, upon executing the instructions, being configured to:

recognize a current state of said software process, said current state being associated with contextual information;

encode, by a first trained neural network, contextual information of said current state to obtain an encoded context, said encoded context being a single numerical representation;

evaluate, based on said encoded context, by a second trained neural network, suitability of at least one process action relative to the current state;

make a recommendation of said at least one process action based on said evaluated suitability;

transmit, to the user interface, said recommendation to a designer of said software process;

receive, from the user interface, a response to said recommendation from said designer; and add said at least one process action to said design of said software process by adding a section of software code corresponding to said at least one process action in the software file when said response is an acceptance of said process action.

10. The system according to claim 9, wherein said at least one process action comprises a plurality of process actions, wherein all of said plurality of process actions are recommended to said user simultaneously.

11. The system according to claim 9, wherein said at least one process action comprises a plurality of process actions, wherein each of said plurality of process actions are recommended to said user sequentially.

12. The system according to claim 9, wherein said current state is related to a current action in said software process.

13. The system according to claim 9, wherein the processor is further configured to store information related to a previous action in said software process, and said information is used in determining said at least one process action to recommend.

14. The system according to claim 13, wherein the processor is further configured to store other information related to other software processes, and wherein said other information is used in determining said at least one process action to recommend.

15. The system according to claim 9, wherein said at least one process action is at least one of:

a data manipulation action;

an action related to an interaction between systems;

a communication-related action; and a storage-related action.

16. The system of claim 13, wherein the processor is further configured to store data related to: said current state; said at least one process action; and said response, and wherein said data is used to refine future recommendations.

17. A non-transitory computer-readable media having encoded thereon computer-readable and computer-executable instructions that, when executed by a processor, implement a method for adding at least one process action to a design of a software process, the software process comprising a plurality of process steps, the software process corresponding to a software file, the processor being operatively connected to a user interface, the method comprising:

recognizing a current state in said software process, said current state being associated with contextual information;

encoding, by a first trained neural network, contextual information of said current state to obtain an encoded context, said encoded context being a single numerical representation;

evaluating, based on said encoded context, by a second trained neural network, suitability of at least one process action relative to the current state;

making a recommendation of said at least one process action based on said evaluated suitability;

transmitting said recommendation to a designer of said software process to the user interface;

receiving, from the user interface, a response to said recommendation from said designer; and adding said at least one process action to said design of said software process when said response is an acceptance of said at least one process action, said adding comprising adding a section of software code corresponding to said at least one process action in the software file.

* * * * *